United States Patent
Pepper, Jr. et al.

[11] 3,814,355
[45] June 4, 1974

[54] DESTRUCTIBLE PARACHUTE

[75] Inventors: William B. Pepper, Jr.; Robert J. Buxton, both of Albuquerque, N. Mex.

[73] Assignee: The United States of America as represented by the United States Atomic Energy Commission, Washington, D.C.

[22] Filed: Aug. 1, 1973

[21] Appl. No.: 384,530

[52] U.S. Cl. .............................................. 244/145
[51] Int. Cl. ........................................... B61d 17/02
[58] Field of Search ..... 244/145, 142; 102/35, 35.2, 102/35.6, 34.1

[56] References Cited
UNITED STATES PATENTS

| 2,439,865 | 4/1948 | Roberts | 244/145 |
| 3,521,840 | 7/1970 | Ainslie | 244/142 |

*Primary Examiner*—George E. A. Halvosa
*Assistant Examiner*—Charles E. Frankfort
*Attorney, Agent, or Firm*—Harry A. Herbert, Jr.; William J. O'Brien

[57] ABSTRACT

A destructable parachute including a canopy of a flammable material having a pyrotechnic coating thereon, a payload object and a plurality of suspension lines interconnecting the canopy and the payload object to provide for the suspension thereof.

1 Claim, 2 Drawing Figures

DESTRUCTIBLE PARACHUTE

BACKGROUND OF THE INVENTION

This invention relates to a destructible parachute. More particularly, this invention concerns itself with a parachute having a pyrotechnic material coated on the parachute fabric with a device attached thereto for effecting the ignition of the parachute.

In present day military operations, it is often most desirable to arrange for a fabric parachute to disappear after performing its deceleration function. Preventing the discovery of the parachute and its payload after ground or water impact is an obvious tactical advantage from a military viewpoint. The use of camouflaged material to prevent detection or the recovery of the parachute by aerial or ground personnel has not proved effective nor feasible, especially when operating within an enemy held territory.

It is most desirable, therefore, that a technique be implemented that can effect the disappearance of a parachute fabric. The only known device of similar character is a light duty parachute made of rice cloth that dissolves when subjected to high humidity or rain for several days. This system suffers a serious disadvantage, however, in that it is dependent on moisture, takes several days to act, and the material is not sufficiently strong for high speed deployment from fighter aircraft.

With the present invention, however, it has been found that a parachute fabric which is provided with a particular type of device for igniting the flammable material can be used to drop a payload at a predesignated drop point with the subsequent destruction and disappearance of all traces of the parachute fabric. In this invention, an 8 to 10 mils thick coating of a particular pyrotechnic coating is applied on to a standard nylon, cotton, or any other suitable fabric. An ignitor device used to initiate burning of the coated parachute fabric is sewn inside of the parachute canopy. After a predetermined time delay, the ignitor initiates burning of the parachute fabric and the subsequent destruction and disappearance of the parachute itself.

SUMMARY OF THE INVENTION

In accordance with this invention, it has been discovered that the military tactical advantage of preventing the detection or observation of a parachute after it has delivered its payload can be accomplished by coating the parachute fabric with a flammable material and igniting the same. The burning and subsequent destruction of the parachute fabric removes all traces of the parachute, thereby effectively preventing the discovery of the parachute's payload by enemy forces.

The parachute fabric is provided with a coating of a pyrotechnic material composed of powdered metal particles, trinitrotoluene crystals and a synthetic resinous material for binding the metal powder and trinitroluene crystals into a coatable composition. An ignitor device comprising an aluminum housing containing a conventional pyrotechnic powder and suitable actuating means is sewn inside the canopy. After dropping its payload, a parachute, fabricated in accordance with the teachings of this invention, can be ignited by a time delay mechanism pre set to a predetermined time period with the subsequent destruction of the parachute and removal of any trace of the fabric material.

Accordingly, the primary object of this invention is to arrange for the disappearance of a fabric parachute after performing its deceleration function.

Another object of this invention is to provide a parachute that is adapted for self destruction in order to prevent its detection or observation by enemy forces after it has delivered its payload to a ground or water drop point.

Still another object of this invention is to provide a parachute fabric with a flammable coating and a means for effecting the self ignition of the coated fabric that is actuable during parachute descent and the delivery of a payload to predesignated drop point.

The above and still other objects and advantages of the present invention will become more apparent upon consideration of the following detailed disclosure thereof when taken in conjunction with the accompanying drawings.

DESCRIPTION OF THE PREFERRED EMBODIMENT

With the above-mentioned and other objects in view, this invention is predicated upon the discovery that the detection and observation of a parachute used to deliver a payload over enemy territory can be prevented by providing the parachute fabric with a particular type of pyrotechnic coating and an ignitor device for igniting the flammable fabric.

Figure 1:
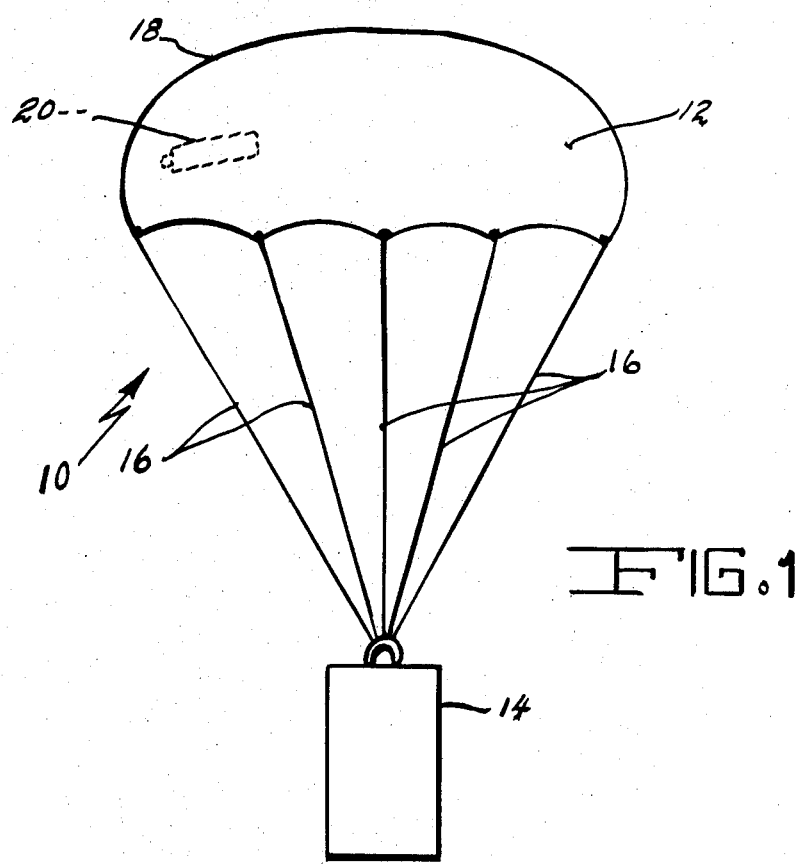
FIG. 1 represents a schematic illustration in cross section showing the parachute of this invention fully deployed in a descending position.

To illustrate the invention with greater particularity, reference is now made to the drawings. FIG. 1 shows a parachute 10 of any type, such as a conventional canopy-type chute, fully deployed during descent. The parachute 10 comprises a fabric material 12, such as nylon, cotton or any other suitable parachute fabric. The fabric in turn is attached to a payload by means of nylon shroud lines 16. An 8 to 10 mil thick specially prepared flexible pyrotechnic coating 18, shown in exaggerated form, is applied to the fabric 12 making it pyrotechnic. The special pyrotechnic coating composition is composed of trinitrololuene crystals, a synthetic resin binder and a finely divided metal powder selected from the group consisting of magnesium, aluminum, titanium and mixtures thereof. An ignitor device 20 is sewn inside of the parachute canopy 12. The following example illustrates the particular coating composition and its method of application to a parachute fabric.

EXAMPLE

A synthetic resin binder in the amount of 150 grams, such as Viton, a synthetic rubber manufactured by DuPont of Wilmington, Del. and chemically defined as a co-polymer of vinylidene/fluoride and hexafluoropropylene, is first dissolved in 900 grams of acetone using a conventional mixing device. 225 grams of trinitrotoluene (TNT) crystals are then added and dissolved, followed by 150 grams of magnesium powder of 3 to 5 micron particle size. The mixture is then poured into a plastic bucket and the parachute is immersed in the coating mixture. The parachute is hung up for 6 hours to dry. A mixture of 150 grams of aluminum and 75 grams of titanium may be substituted for the 150 grams of magnesium powder.

Figure 2:
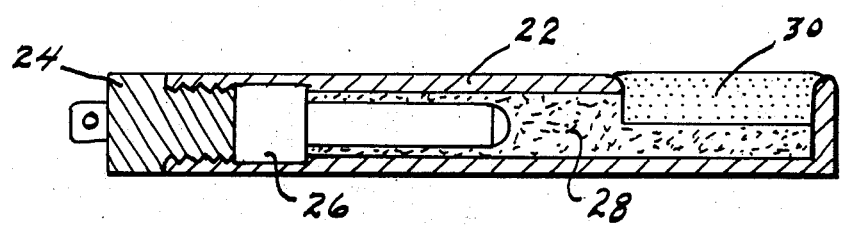
FIG. 2 represents a schematic illustration of the ignitor device used in carrying out the invention.

The ignitor device used to ignite the treated parachute fabric described in Example 1 is shown in FIG. 2. It consists of an aluminum housing 22 which measures about 6 inches long, ½ inch wide diameter with a 1/16 inch wall thickness. A standard Atlas mechanical actuator 24 is screwed into one end of the housing 22 to initiate a standard Atlas pyrotechnic time delay cartridge 26 adapted to actuate at predetermined time periods of 2, 4, 6 or 10 seconds. About 8 grams of a pyrotechnic mix 28, such as Pyromix which is composed of 20 percent Teflon, 16.5 percent magnesium and 64.5 percent cupric oxide, is loaded into the housing prior to inserting the delay cartridge 26 and actuator 24. The Pyromix 28 is retained inside the ignitor by wrapping two turns of adhesive tape 30 around a vent slot not shown in the drawing. The ignitor device is then sewn inside a parachute fabric panel as shown in FIG. 1. The pyrotechnic coating 12 may also be applied in thin strips to cut the parachute into quadrants, thereby preventing dropping of the canopy over the attached payload at impact or the parachute can be severed from the payload by ignition of the nylon lines at their attachment point.

While the principle of this invention has been described with particularity, it should be understood that various alterations and modifications can be made without departing from the spirit of the invention, the scope of which is defined by the appended claim.

What is claimed is:

1. A destructible parachute apparatus including:
   a. a canopy;
   b. a payload object;
   c. a plurality of suspension lines interconnected between said canopy and said payload object for the suspension thereof; and
   d. said canopy composed of:
      1. a flammable material coated with a pyrotechnic composition consisting essentially of a mixture of trinitrotoluene, a synthetic resinous binder, and a finely divided metal powder selected from the group consisting of magnesium, aluminum and titanium; and
      2. an igniter means attached to said canopy for igniting said pyrotechic composition to effect the destruction of said canopy.

* * * * *